Patented May 29, 1928.

1,671,856

UNITED STATES PATENT OFFICE.

HENRY V. DUNHAM, OF BAINBRIDGE, NEW YORK.

COATED BOOK CLOTH AND COMPOSITION THEREFOR.

No Drawing.    Application filed April 1, 1925.  Serial No. 19,997.

The present invention relates to coating book fabrics and similar fabrics, namely cloth such as is used commonly for making cloth bound books, and involves the process of coating the said cloth with a novel composition also embraced within the scope of the invention, whereby certain useful effects are produced in the fabrics. The invention further embraces the coated fabric.

I have found that particular kinds of clay, commonly designated under the name "bentonite," in combination with an alkaline solution of casein, produces a novel effect, when used in coating book cloth fabrics and the like, the result being particularly favorable when the proportion of casein to bentonite is approximately two to one, although it will be understood that the invention is not restricted to these absolute figures, but the proportion can vary more or less from these figures. The degree of concentration of the coating composition can vary between rather wide limits, as indicated in the examples given below.

With such a composition as is herein described, the coating of the fabric does not hide the original color of the fabric, but the coating is free or substantially free from gloss, thereby producing a dull or mat finish, on the cloth. This is regarded as an important feature of the invention, and it may be called to attention that while casein solution alone can be applied to fabrics, and has heretofore been applied to fabrics and dried, such a procedure produces a cloth which carries a high gloss, which is objectionable for certain purposes.

*Example 1.*—30 pounds of bentonite which has been ground and sifted to pass through a 30 mesh screen, is intimately mixed in the dry state, with about 60 pounds of an ordinary commercial grade of ground casein and about 10 pounds of powdered borax (or enough of another alkali to effect solution of the casein). This mixture is thoroughly agitated in an ordinary revolving drum or other suitable mixer when it is ready to be used; (when made up with water with the aid of heat) as a sizing composition for book cloth and the like, the preferable method is as follows:—

100 pounds of the above dry mixture is added to 800 pounds of cold water. The mixture is thoroughly stirred and heated in a jacketed kettle, or preferably, by a steam jet, to about 160 deg. F. The mixing is continued until a perfectly smooth homogeneous product is obtained. The casein and alkali of course react and dissolve and the bentonite becomes suspended therein. The resulting mixture can now be applied in the usual way well known in the art to the fabric to be coated and when the coated fabric is dried may be calendered or brushed or otherwise treated by the methods well known to the art in the manufacture of coated fabrics.

*Example 2.*—In another mode of producing the composition, I may dissolve alkalized casein and soften up the bentonite by means of water, as separate operations, and then combine the two to produce this effect. In such a case 60 pounds of casein and about 10 pounds of borax are mixed together and added to say 296 pounds of cold water. The mixture is stirred to break up the lumps and heated to 160 deg. F. in any suitable container, either by means of a steam jacket or by means of a jet of steam. When the casein is entirely dissolved I add it to a mixture (or suspension) of water and bentonite, a mixture of 30 pounds of bentonite and 120 pounds of water being suitable. This latter may be at room temperature. The bentonite and water should have been mixed together at least two hours in advance of the time when it is to be mixed with the casein solution. When the casein solution and the bentonite are well incorporated by suitable agitation, the mixture is ready to be used as a coating for book cloth and the like or it may be reheated say to about 150–180° F., in order to get it in a somewhat thinner condition before applying to the book cloth. After this coating is applied the fabric is dried, calendered and finished in the usual way well known to the art.

In the above examples I have referred to the use of borax as the alkali, with which to dissolve the casein in water. Also the amount of alkali there stated is 10 pounds of borax per 60 pounds of casein. The proportion of alkali can be varied considerably, and if desired a different alkali in place of borax can be used. For example sodium carbonate or sodium bicarbonate could be used in the dry state, in producing a dry mixture such as is referred to in Example 1.

I am of course aware that heretofore various compositions for coatings have been proposed, containing an adhesive or sizing composition and clay. In such compositions however it has heretofore been really a question of producing a coating of clay or clay material upon the fabric or other face, the sizing serving as a vehicle for carrying the same. In the present case however, the object is to produce a substantially transparent coating which is substantially free from gloss or luster, upon the fabrics, and a substantial excess of casein over the amount of bentonite is accordingly employed.

It will be understood that the proportions as given in the above examples are given for the purpose of illustration only, and not as restricting the invention thereto, the invention embraces broadly the employment of bentonite in casein solutions, in which the amount of casein is substantially in excess of the amount of bentonite.

I claim:—

1. A base for a liquid coating composition adapted for application to book cloth and like fabrics, comprising casein, an alkaline material and bentonite capable of being suspended in a casein solution, the amount of casein being substantially greater than the amount of bentonite.

2. A base for a liquid coating composition adapted for application to book cloth and like fabrics, comprising casein and bentonite capable of being suspended in a casein solution, the amount of casein being substantially double the amount of bentonite.

3. A mixture comprising casein, a sufficient amount of an alkaline material to form a solution of the casein in water, and bentonite in a finely divided state, the amount of casein being substantially greater than the amount of bentonite.

4. A substantially dry mixture of 60 parts of casein, 10 parts of borax and 30 parts of bentonite.

5. A process which comprises adding the mixture of claim 4 to several times its weight of water, and coating the same upon book cloth, whereby a substantially transparent but not shiny coating is produced on said cloth.

6. A process which comprises applying to book cloth, a liquid coating composition comprising casein dissolved in water, and carrying bentonite in amount substantially less than said casein, and drying the same.

7. A process for producing upon bookcloth a substantially transparent but not shiny coating, which consists in applying to the said cloth a mixture of 30 parts of bentonite, 60 parts of casein and 10 parts of borax, with sufficient water to form a liquid coating composition, and drying the same.

8. A process of coating book-cloth, which consists in forming a mixture including bentonite with casein dissolved in an aqueous solution of an alkali; spreading the mixture upon the said book-cloth and thereafter drying the same.

9. Book cloth carrying a coating containing casein and bentonite, such coating being substantially free from gloss or luster, and being substantially transparent so as not to hide the color of the cloth.

10. Book cloth carrying a coating containing about two parts of casein and one part of bentonite, such coating being substantially free from gloss or luster, and being substantially transparent so as not to hide the color of the cloth.

In testimony whereof I affix my signature.

HENRY V. DUNHAM.